US009465472B1

(12) United States Patent
Almanza-Workman et al.

(10) Patent No.: US 9,465,472 B1
(45) Date of Patent: Oct. 11, 2016

(54) METAL MESH TOUCH SENSOR WITH LOW BIREFRINGENCE SUBSTRATE AND ULTRAVIOLET CUT

(71) Applicant: Amazon Technologies, Inc., Seattle, WA (US)

(72) Inventors: Angeles Marcia Almanza-Workman, Sunnyvale, CA (US); Heang Heng, San Jose, CA (US); Thiagarajan Marimuthu, Johor (MY); Lakshman Rathnam, Mountain View, CA (US); Krishan Yadav, San Jose, CA (US); Jianjun Yang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/565,187

(22) Filed: Dec. 9, 2014

Related U.S. Application Data

(60) Provisional application No. 62/043,881, filed on Aug. 29, 2014.

(51) Int. Cl.

| G06F 3/045 | (2006.01) |
|---|---|
| G06F 3/041 | (2006.01) |
| G06F 3/044 | (2006.01) |
| G02B 1/10 | (2015.01) |
| G02B 5/20 | (2006.01) |
| G02B 5/32 | (2006.01) |

(52) U.S. Cl.
CPC ............ G06F 3/0412 (2013.01); G02B 1/10 (2013.01); G02B 5/208 (2013.01); G02B 5/32 (2013.01); G06F 3/044 (2013.01); G06F 2203/04103 (2013.01)

(58) Field of Classification Search
CPC .... G06F 1/1643; G06F 3/0416; G06F 3/044; G06F 2203/04103; G02F 1/13338; G02B 5/32
See application file for complete search history.

(56) References Cited

U.S. PATENT DOCUMENTS

| 6,570,707 | B1 * | 5/2003 | Murakami | G06F 3/045 250/225 |
|---|---|---|---|---|
| 6,593,408 | B1 * | 7/2003 | Takaki | A61K 8/11 524/414 |
| 6,812,974 | B1 * | 11/2004 | Hinata | G02B 6/0086 349/12 |
| 7,097,903 | B2 * | 8/2006 | Kishioka | C09J 7/02 156/306.6 |
| 7,920,129 | B2 * | 4/2011 | Hotelling | G06F 3/0416 178/18.01 |
| 2006/0069216 | A1 * | 3/2006 | Isozaki | C08L 83/06 525/479 |
| 2008/0062147 | A1 * | 3/2008 | Hotelling | G02F 1/13338 345/174 |
| 2009/0231517 | A1 * | 9/2009 | Shiraogawa | G02F 1/133632 349/75 |
| 2010/0062189 | A1 * | 3/2010 | Yosomiya | G02B 1/105 428/1.31 |
| 2010/0086706 | A1 * | 4/2010 | Everaerts | B32B 27/00 428/1.54 |

(Continued)

*Primary Examiner* — Joe H Cheng
(74) *Attorney, Agent, or Firm* — Lee & Hayes, PLLC (57) ABSTRACT

A touch-sensitive display for an electronic device may include a touch sensor comprising a low birefringence substrate, ultraviolet (UV) stabilizers, and a metal mesh disposed on at least a portion of the low birefringence substrate. The low birefringence characteristic of the touch sensor substrate causes the touch sensor to exhibit low haze, high transmittance, and substantially no color, which provides improved optical properties over conventional touch sensor substrate materials used with metal mesh film. In some embodiments, the retardation value of the touch sensor substrate may be no greater than about 15 nanometers (nm). Additionally, the UV stabilizers prevent the substrate from yellowing and becoming brittle from exposure to UV radiation.

27 Claims, 6 Drawing Sheets

(56) References Cited

U.S. PATENT DOCUMENTS

| | | | |
|---|---|---|---|
| 2010/0247940 A1* | 9/2010 | Takahashi | C08F 2/48 428/522 |
| 2011/0063244 A1* | 3/2011 | Hu | B32B 37/1284 345/174 |
| 2012/0302676 A1* | 11/2012 | Oya | C08J 5/18 524/89 |
| 2013/0127776 A1* | 5/2013 | Guard | G06F 3/0412 345/174 |
| 2013/0202880 A1* | 8/2013 | Nabeshima | C08J 7/047 428/336 |
| 2014/0162057 A1* | 6/2014 | Cho | C09J 4/06 428/339 |
| 2014/0168133 A1* | 6/2014 | Yilmaz | G06F 3/044 345/174 |
| 2014/0192277 A1 | 7/2014 | Yilmaz et al. | |
| 2014/0205827 A1* | 7/2014 | Mun | C09J 7/0217 428/220 |
| 2014/0251662 A1* | 9/2014 | Rotto | C09J 9/02 174/253 |

* cited by examiner

Fig. 3

Fig. 4
(SECTION B-B)

Fig. 5
(Section B-B)

METAL MESH TOUCH SENSOR WITH LOW BIREFRINGENCE SUBSTRATE AND ULTRAVIOLET CUT

CROSS REFERENCE TO RELATED APPLICATIONS

This application is based on and claims priority to U.S. Provisional Application No. 62/043,881, filed on Aug. 29, 2014, entitled, "LOW BIREFRINGENCE METAL MESH FILM TOUCH SENSOR STACK," the contents of which are herein incorporated by reference.

BACKGROUND

Touch screen displays are becoming ubiquitous in electronic devices such as tablets, electronic book readers (e-book readers), and many others. In these electronic devices, the display screen itself becomes both an output device and an input device. End users of such devices expect high performance of both input and output functionalities. As an output device, users expect to be able to view the display from any orientation and over a broad spectrum of ambient lighting conditions (e.g., across a spectrum from indoor environments with low ambient lighting to outdoor environments in direct sunlight). As an input device, users expect a robust, reactive touch screen that works in the first instance of touching the screen. As a result, consumers will not settle for a compromise in performance of either input or output functionality of a touch screen; they want optimal performance in both. For example, if the touch sensor of the display degrades optical quality to any noticeable degree, the device becomes suboptimal from a consumer perspective. At the very least, consumers will not tolerate functional failure of the device, which may be caused by breakdown of the materials used for individual components of touch screen. For instance, exposure to ultraviolet (UV) radiation may accelerate failure conditions through UV degradation (e.g., increased brittleness) of the materials used for various components of the electronic device, such as the touch sensor substrate.

Some touch screen devices utilize indium tin oxide (ITO) to provide a conductive, yet transparent, layer for sensing touch-based input. ITO-based touch sensors may be suitable in small form factor devices (e.g., devices with 5 inch diagonal displays and smaller), but ITO has limitations in larger form factor devices. For example, in tablets and other "large" touch screen devices (e.g., devices larger than 10 inch diagonal displays), there is a tradeoff between good conductance and good transparency when a device is constrained to using ITO-based touch sensors because thicker ITO is needed for suitable conductance, which results in poor optical quality of the touch sensor.

In addition, conventional touch sensors typically utilize materials such as polyethylene terephthalate (PET) for a touch-sensor substrate. PET is known to exhibit unsuitably high birefringence that degrades the optical quality of the touch sensor, which, in turn, lowers the optical performance of the display. In some instances, PET and like materials can cause colorations across the field of view of the display that resemble a rainbow-like artifact on the displayed image. This can be exacerbated when a user is wearing polarized sunglasses, which may result in a rainbow-like artifact across the entire display surface. PET can also exhibit relatively high haze, low transmittance, and/or discernable color that negatively impacts the optical performance of the display. Moreover, permanent discoloration (e.g., yellowing) of the PET is known to occur under UV radiation (e.g., sunlight).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Disclosed herein is a touch-sensitive display for an electronic device. The touch-sensitive display may include a touch sensor (sometimes referred to herein as a touch "panel") comprising a low birefringence substrate, ultraviolet (UV) stabilizers, and a metal mesh disposed on at least a portion of the front and back surfaces of the low birefringence substrate. The low birefringence characteristic of the touch sensor substrate causes the touch sensor to exhibit low haze, high transmittance, and substantially no color, which provides improved optical properties over conventional touch sensor substrate materials used with metal mesh film. In some cases, the refractive index of the low birefringence substrate may be similar to that of glass. Moreover, the UV stabilizers prevent the substrate from yellowing and/or becoming brittle upon exposure to UV radiation, which may occur during a manufacturing process and/or during use of the electronic device by an end consumer. The UV stabilizers may be disposed in the substrate, on at least a portion of a surface of the substrate, or on at least a portion of the metal mesh.

Polarized light propagating through the touch sensor substrate may experience a different index of refraction for different directions of propagation and polarization orientations of the incident light. This may be due to the material of the substrate, and may cause orthogonal portions of the linearly polarized light to become out-of-phase due to velocity differences influenced by the different indices of refraction. This phenomenon is known as birefringence. In some embodiments, the birefringence of the substrate may be characterized in terms of a retardation (or retardance) value. Retardation represents the integrated effect of birefringence acting along a path of a light beam that traverses the touch sensor substrate. Particularly, the retardation value is a measure of the phase difference between the two orthogonal portions/components of polarized light that exit the substrate, and it may be expressed in units of length (e.g., nanometers). Measuring the retardation value for a given substrate is a suitable way to measure the birefringence of the substrate. Accordingly, in some embodiments, the retardation value of the substrate may be no greater than about 15 nanometers (nm).

The low birefringence substrate and the UV stabilizers, in combination with the metal mesh of the touch sensor, may extend the lifespan of the touch sensor (e.g., introduction of UV stabilizers makes the substrate more durable and less prone to fracture) while also improving performance in both the touch-based input functionality and the optical output functionality of an electronic device's display. Particularly, 10 inch diagonal and larger displays that incorporate the low birefringence substrate-metal mesh touch sensor exhibit improved touch screen performance over conventional systems.

The techniques, systems, and devices described herein may be implemented in a number of ways. Example implementations are provided below with reference to the following figures.

Example Devices

Figure 1:
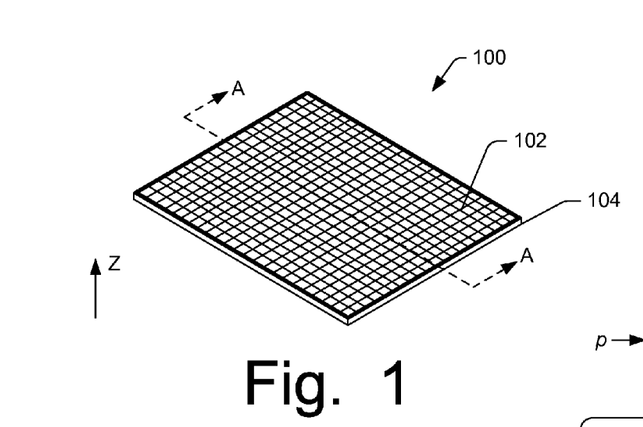
FIG. 1 illustrates a perspective view of an example touch sensor that is configured to detect touch-based input on a display screen of an electronic device.
Figure 2:
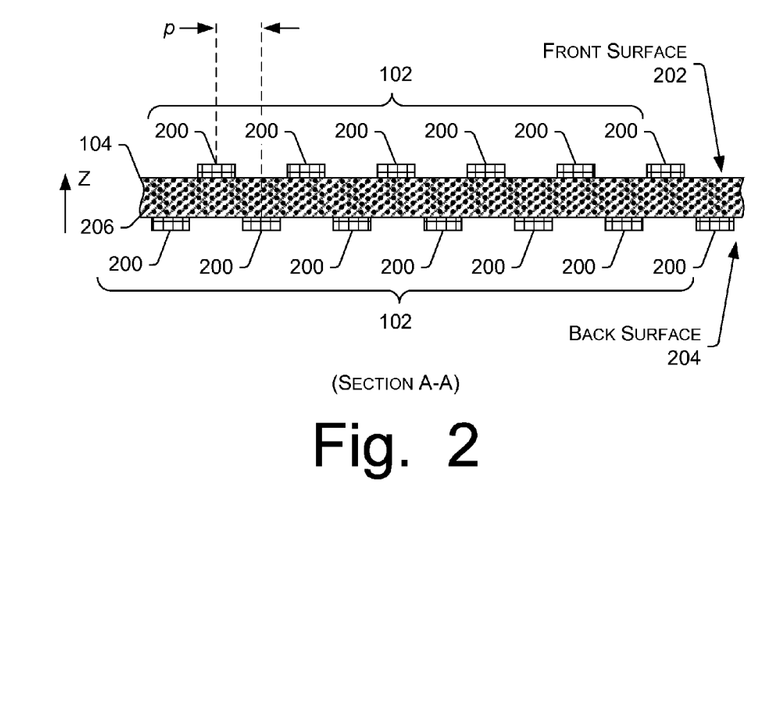
FIG. 2 illustrates a side, cross-sectional view of a portion of the example touch sensor of FIG. 1 along section A-A.

FIG. 1 illustrates a perspective view of an example touch sensor 100 (sometimes referred to herein as the "touch panel 100") that is configured to detect touch-based input on a display screen of an electronic device. FIG. 2 illustrates a side, cross-sectional view of a portion of the example touch sensor 100 of FIG. 1 along section A-A.

The touch sensor 100 may comprise a metal mesh 102 disposed on a substrate 104. The metal mesh 102 may be comprised of a conductive metal such as silver (Ag), copper (Cu), or a combination or alloy thereof. The pattern of the metal mesh 102 may be any suitable pattern of metal lines 200 or particles, and the pattern can be regular or irregular/random. FIG. 1 shows the metal mesh 102 as having a square grid pattern comprised of rows and columns of woven or crossing metal lines 200 (See FIG. 2), but any other type of pattern (e.g., a honeycomb patterned grid, a diamond pattern, a random pattern, etc.) may be utilized for the metal mesh 102 of the touch sensor 100. A random pattern of metal lines 200 may prevent noticeable Moiré patterns from appearing on the display screen of the electronic device.

As shown in FIG. 2, the metal lines 200 or particles that constitute the metal mesh 102 may be deposited on a front surface 202 of the substrate 104 and a back surface 204 of the substrate 104. The front surface 202 of the substrate 104 represents the surface of the substrate 104 that is to be closest to a cover lens of the electronic device where touch input may occur. In some embodiments, the metal lines 200 that are disposed on the front surface 202 of the substrate 104 may represent a transmitter portion of a transcapacitive-type sensor while the metal lines 200 that are disposed on the opposite side (i.e., the back surface 204) of the substrate 104 may represent a receiver portion of the transcapacitive-type sensor, or vice versa. In some embodiments, two substrates, such as the substrate 104 may be provided, with one metal mesh 102 disponed on a surface (e.g., the front surface) of a first substrate 104, and another metal mesh 102 disposed on a surface (e.g., the front surface) of a second substrate 104. In yet other embodiments, the metal mesh 102 may be disposed on a single side or surface (e.g., the front surface 202) of the substrate 104 where both the transmitter and receiver portions of the touch sensor 100 are on the same side of the substrate 104. In this scenario, individual ones of the metal lines 200 on a surface (e.g., the front surface 202) of the substrate 104 may correspond to the transmitter portion of the touch sensor 100 while different ones of the metal lines 200 on the same surface of the substrate 104 may correspond to the receiver portion of the touch sensor 100. A touch sensor 100 of this design may be configured to detect touch-based input from an object (e.g., a finger) in proximity to the touch sensor 100 by detecting a change in the capacitive coupling between the transmitter and the receiver portion of the metal mesh 102. That is, an object brought in proximity (i.e., within a sensing region) of the touch sensor 100 will cause a change in the capacitive coupling that may be translated into a detection of touch-based input.

The substrate 104 may have a low birefringence characteristic that allows the substrate 104 to exhibit good optical performance, such as low haze (e.g., a haze of no greater than about 0.5%), high transmittance (e.g., a transmittance of at least about 90%), and substantially no discernable color (e.g., a b* value that is no greater than about 0.5) for relevant wavelengths of light. As noted above, birefringence is the phenomenon that occurs when an optical material (in this case, the substrate 104) in the path of a beam of light causes the beam of light to be split into two polarization portions of the beam, which travel at different velocities. The phase difference between the two out-of-phase orthogonal portions of the polarized light that exit the substrate 104 may be measured as the retardation value, expressed in units of length, such as nanometers (nm) In some embodiments, the substrate 104 of the touch sensor 100 may have a retardation value that is no greater than about 15 nm. Such a substrate 104 is considered herein to have a "low" birefringence. In some cases, the substrate 100 may have a retardation value that is no greater than about 4 nm.

The substrate 104 may further comprise ultraviolet (UV) stabilizers 206 to protect the substrate 104 from exposure to UV radiation, which may cause UV degradation in the substrate 104 material. That is, the material of the substrate 104 (which may have a relatively low tensile modulus, low ultimate elongation, and/or low hardness, at least as compared to PET) may benefit from added UV protection (UV blockage) so that the substrate 104 is not susceptible to rapid break down and brittleness (e.g., scission of polymer chains that reduce the mechanical strength of the material) that can result from exposure to UV radiation. The breakdown and brittleness of a substrate without UV cut that is caused by exposure to UV radiation can be very noticeable on low birefringence substrates (e.g., causing microcracks that may impact functional operation of the touch sensor). Although perhaps less noticeable than the degradation to mechanical characteristics of the substrate, exposure to UV radiation can also cause yellowing of optically clear material, such as the substrate 104 material. For example, UV exposure may cause oxidation of the polymer molecules, resulting in a yellow color of the material after UV exposure. For PET material, the impact on mechanical characteristics may be less severe, while the impact on color tends to be more noticeable. The inverse has been observed for low birefringence materials (i.e., the impact on color is less noticeable while the impact on mechanical characteristics is more noticeable). Moreover, the fact that the metal mesh 102 may cover about 2% of the surface area of the substrate 104 means that a majority (roughly 98%) of the substrate's surface remains exposed even after the metal mesh 102 is applied on the substrate 104.

The substrate 104 may be exposed to UV radiation during the manufacturing process of an associated device due to various UV cured materials (e.g., optically clear adhesive (OCA) layers, passivation coatings, edge sealants, etc.) used in the manufacturing process. Examples of these UV-cured materials will be described in more detail with reference to the following figures. Without the UV stabilizers 206, the substrate 104 is likely to become brittle due to the UV exposure experienced during manufacturing and during the lifespan of the device in which the substrate 104 is implemented. In some cases, the brittleness of a substrate 104 without the UV stabilizers 206 may cause cracks to form around the edges of the substrate 104 when the substrate 104 is handled during the manufacturing process, which may cause premature failure of the device in which the substrate 104 is implemented. When the electronic device is used outdoors, the substrate 104 may be exposed to further UV radiation. Thus, UV protection may prolong the lifespan of the substrate 104 and the corresponding electronic device by increasing the stability of the substrate material (i.e., maintaining strength, flexibility, clarity, etc.). As used herein, UV radiation may comprise electromagnetic radiation with a wavelength shorter than that of visible light, or from about 10 nm to about 400 nm.

FIG. 2 shows the UV stabilizers 206 as being embedded within the substrate 104. Alternatively, or additionally, UV stabilizers (or UV cut material) may be provided as one or more layers (or a coating) directly on the front and back surfaces 202, 204 of the substrate 104 such that the metal mesh 102 is applied atop the UV cut coating of the substrate 104. As used herein, "coating" a surface with a material (e.g., UV cut material) is synonymous with "forming a layer" of the material on the surface. That is, a "coating", as used herein, can partially cover the surface that it is applied to. The UV cut coating will be shown and described in more detail with reference to FIG. 5, below. In some embodiments, a coating having UV stabilizers may be applied over (atop) the metal mesh 102, such as with a multi-function (passivation plus UV cut) coating applied atop the metal mesh 102.

It is to be appreciated that the UV stabilizers included in or on the substrate 104 (e.g., the UV stabilizers 206) are to preserve the optical performance of the substrate 104. For example, the UV cut substrate 104 may exhibit low haze (e.g., a haze of no greater than about 0.5%), high transmittance (e.g., a transmittance of at least about 90%), and substantially no discernable color (e.g., a b* value that is no greater than about 0.5) for relevant wavelengths of light. Furthermore, the UV stabilizers 206 of the low birefringence substrate 104 may cut (block/prevent substrate exposure to) electromagnetic radiation with a wavelength that is less than or equal to at least about 380 nm. In some embodiments, the UV stabilizers 206 may cut electromagnetic radiation with a wavelength that is less than or equal to about 400 nm. For example, the transmittance of the substrate 104 with the UV stabilizers 206 may vary across a range of electromagnetic wavelengths such that, at a wavelength of about 360 nm, the transmittance of the substrate 104 with UV stabilizers 206 may be no greater than about 0.1%, at a wavelength of about 380 nm, the transmittance may be no greater than about 0.5%, at a wavelength of about 400 nm, the transmittance may be at least about 80%, and at a wavelength of about 420 nm, the transmittance may be at least about 90%. This illustrative example demonstrates a scenario where electromagnetic radiation with a wavelength that is less than or equal to at least about 380 nm is substantially blocked by virtue of the UV stabilizers 206. It is to be appreciated that the numbers listed are merely example values, and any suitable range of wavelengths may be cut in a similar fashion using the UV stabilizers 206.

Any suitable UV stabilizer 206 may be used for the UV cut of the substrate 104, such as UV absorbers, Hindered Amine Light Stabilizers (HALS), or the like. UV absorber-type stabilizers work by absorbing the UV rays and dissipating them into thermal energy. UV absorber chemistries may include benzophenones, benzotriazoles, or hydroxyphenyl triazines. HALS work by scavenging free radical intermediates generated by the UV rays to neutralize the degradation.

Figure 3:
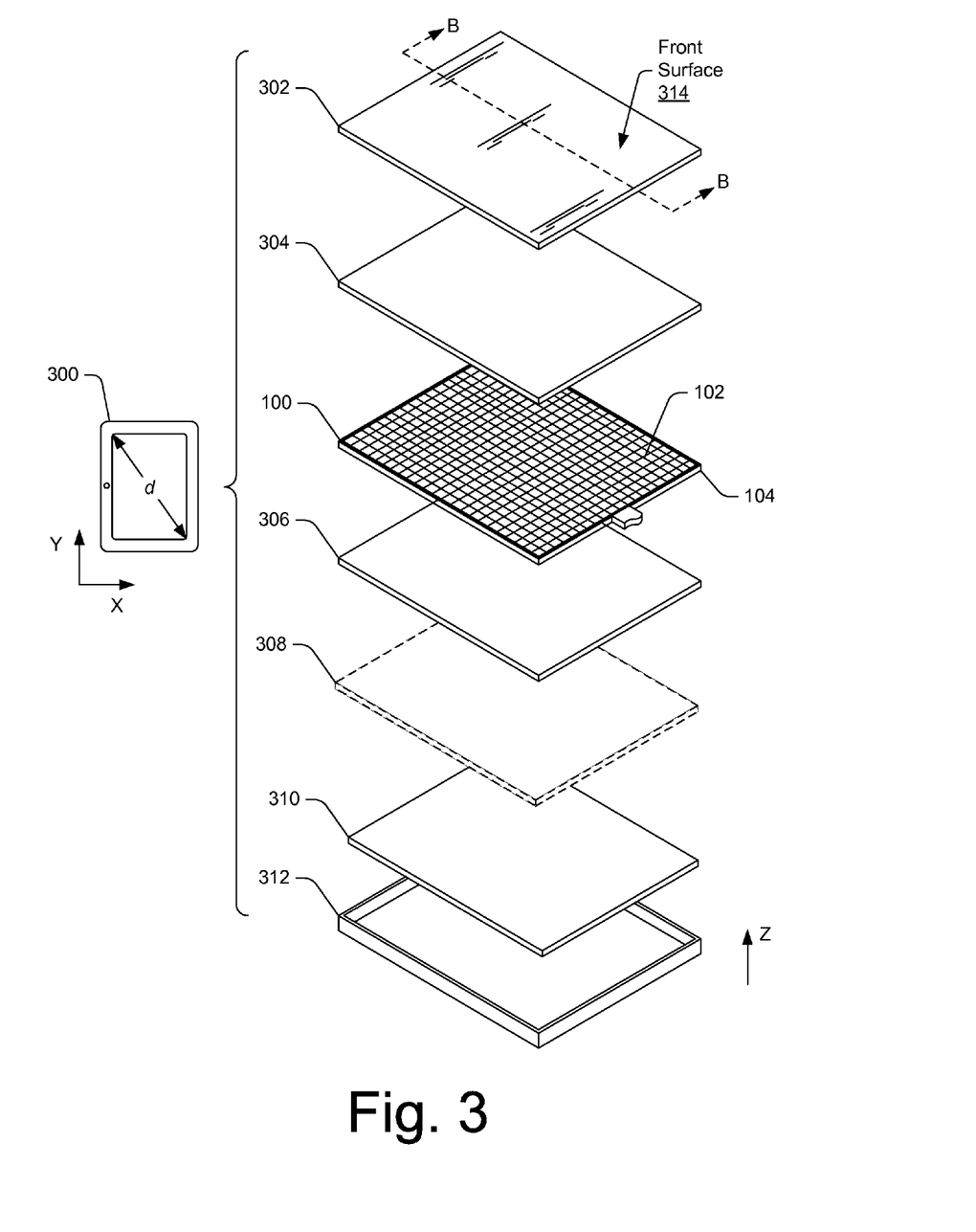
FIG. 3 illustrates a perspective view of example components of an example electronic device, the components constituting at least part of a touch screen display of the electronic device.

FIG. 3 illustrates a perspective view of example components of an example electronic device 300 incorporating the touch sensor 100 of FIG. 1. The components in FIG. 3 constitute at least part of a touch screen display of the electronic device 300. Accordingly, the electronic device 300 may be any touch-sensitive device that provides a touch screen for both input functionality and output functionality of the electronic device 300. The electronic device 300 may therefore include, but is not limited to, a tablet computer, an electronic book (e-book) reader, a smart watch or similar wearable computer with a display, a smart phone, a laptop or notebook computer, a desktop computer display, a television display, a wall mounted display, a panel display, an automobile display, a navigation device display (e.g., global positioning system (GPS) device display), a point of sale terminal display, an automated teller machine (ATM) display, or any similar consumer or industrial touch-sensitive display device. FIG. 3 shows the electronic device 300 in the form of a tablet computer, which may have a display screen size, d, of about 10 inches along the diagonal of the display. However, electronic devices of varying screen size may benefit from the techniques and systems disclosed herein.

The components that constitute at least part of the touch screen display of the electronic device 300 may include (from top to bottom in FIG. 3), without limitation, a cover lens 302, a first optically clear adhesive (OCA) layer 304, a touch sensor 100, a second OCA layer 306, a protection film 308 (also shown in FIG. 5), a display module 310, and a rear cover 312. Some or all of the components 302-312 may be utilized for a touch screen of the electronic device 300. Furthermore, the display module 310 may be based on any suitable display technology, including, but not limited to, a liquid crystal display (LCD) module, an organic light-emitting diode (OLED) module, an electrophoretic display module, a plasma display module, a light emitting diode (LED) display module, a field emission display (FED) module, and so on. The display module 310 may (sometimes referred to as a "display panel 310") may be configured to generate an image using driving electronics, a substrate, and picture elements, among other elements of the display module 310.

The cover lens 302 is configured to protect the interior components of the electronic device 300, including the touch sensor 100. The cover lens 302 is transparent to enable a viewing user of the electronic device 300 to view displayed images generated by the display module 310. The cover lens 302 may be made of a rigid, or semi-rigid, material that provides the interior components sufficient protection from objects and environmental elements (e.g., water or moisture, dirt/dust, etc.). For example, the cover lens 302 may include a glass material, a plastic material, or some composite or combination thereof. In some cases, the cover lens 302 may include a poly(methyl methacrylate), (PMMA), a polycarbonate (PC), or a combination thereof.

The cover lens 302 may be disposed atop the first OCA layer 304, and the cover lens 302 has a front surface 314 that, in general, faces the viewing user when the electronic device 300 is used as a viewing device (e.g., when the electronic device 300 is used to view images, documents, videos, etc.). The front surface 314 of the cover lens 302 is shown as being oriented in the positive z-direction of a three-dimensional Cartesian coordinate system (e.g., denoted by x, y, z) shown in FIG. 3. It is to be appreciated that each of the components 302-312 shown in FIG. 3 may include surfaces that can be referenced in a similar manner. That is, each of the components 302-312 may have a front surface oriented in the positive z-direction of FIG. 3 (i.e., closer to a viewing user), and a back surface oriented in the negative z-direction of FIG. 3 (i.e., farther from the viewing user).

The cover lens 302 may have a thickness (in the z-direction of FIGS. 3-5) included in a range of about 0.1 millimeters (mm) to about 0.8 mm. In some embodiments, the thickness of the cover lens 302 may be no greater than about 0.8 mm, no greater than about 0.7 mm, no greater than about 0.6 mm, no greater than about 0.5 mm, no greater than about 0.4 mm, no greater than about 0.3 mm, or no greater than about 0.2 mm. In some embodiments, the thickness of the cover lens 302 may be at least about 0.1 mm, at least about 0.2 mm, at least about 0.3 mm, at least about 0.4 mm, at least about 0.5 mm, at least about 0.6 mm, or at least about 0.7 mm. In some embodiments, the thickness of the cover lens 302 may be about 0.7 mm. In some embodiments, the thickness of the cover lens 302 may be about 0.55 mm.

The cover lens 302 may be augmented with UV stabilizers, such as a UV cut material or coating, to protect one or more interior components of the electronic device 300 from exposure to UV radiation. In some embodiments, the cover lens 302 may comprise UV stabilizers including, without limitation, a tantalum pentoxide ($Ta_2O_5$) UV coating, or a silicon dioxide ($SiO_2$) UV coating, such as those manufactured by Shincron Co., Ltd.® of Yokohama, Japan.

The first OCA layer 304 may be disposed under the cover lens 302. The first OCA layer 304 may generally be comprised of a die-cut film adhesive that is configured to bond the cover lens 302 to the touch sensor 100. Such a bond may be referred to as an optical bond. During a manufacturing process, the first OCA layer 304 may be cured through UV radiation, heat, or a combination thereof. When a UV-cured first OCA layer 304 is utilized, the UV stabilizers 206 of the substrate 104 become all the more protective of the material properties of the substrate 104 due to the UV exposure that the substrate 104 will endure during the manufacturing process. The optical bond created by the first OCA layer 304 may improve the contrast ratio of the touch screen display by reducing some portion of reflected light as compared to having an air gap between the touch sensor 100 and the cover lens 302. The improved optical performance due to the optical bond created by the first OCA layer 304 may be most noticeable in outdoor environments when the electronic device 300 is in direct sunlight.

An example material that can be utilized for the first OCA layer 304 is the "3M Optically Clear Adhesive 8146®," commercially available from 3M Company® of St. Paul, Minn. In some embodiments, the material of the first OCA layer 304 may be compatible with the metal materials used for the touch sensor 100, such as silver (Ag), copper (Cu), and the like, which is described in more detail below. As such, the first OCA layer 304 can be configured to not impact electrical properties of the touch sensor 100, especially in extreme temperature and humidity conditions.

In some embodiments, the material of the first OCA layer 304 may also have low water absorption to prevent electromigration with the metal (e.g., Ag) used in the touch sensor 100. In some embodiments, the material of the first OCA layer 304 is acid-free to avoid corroding the metal of the touch sensor 100.

The material of the first OCA layer 304 may also be color-stable under exposure to sunlight during a lifespan of the electronic device 100 (which may be simulated by exposing the device to at least about 300 hours of UV radiation). Color stability may be measured by a parameter called the "color difference." One suitable measure for color difference (i.e., delta) is based on the standard L, a, b, (LAB) color space defined by the Commission Internationale de l'Eclairage—the International Commission on Illumination (CIE), or the CIELAB color space. On the b-b axis of the CIELAB color chart, for example, the amount of yellow color is defined in the positive b-direction, and the amount of blue color is defined in the negative b-direction. Accordingly, the material for the first OCA layer 104 may exhibit color stability if, after about 300 hours of exposure to UV radiation, the delta b* value (color difference) of the first OCA layer 304 is measured to be no greater than about 0.5. Although the above-mentioned 3M OCA 8146® material is a suitable material for the first OCA layer 304, any other material with the aforementioned properties may be used for the material of the first OCA layer 304.

Figure 4:
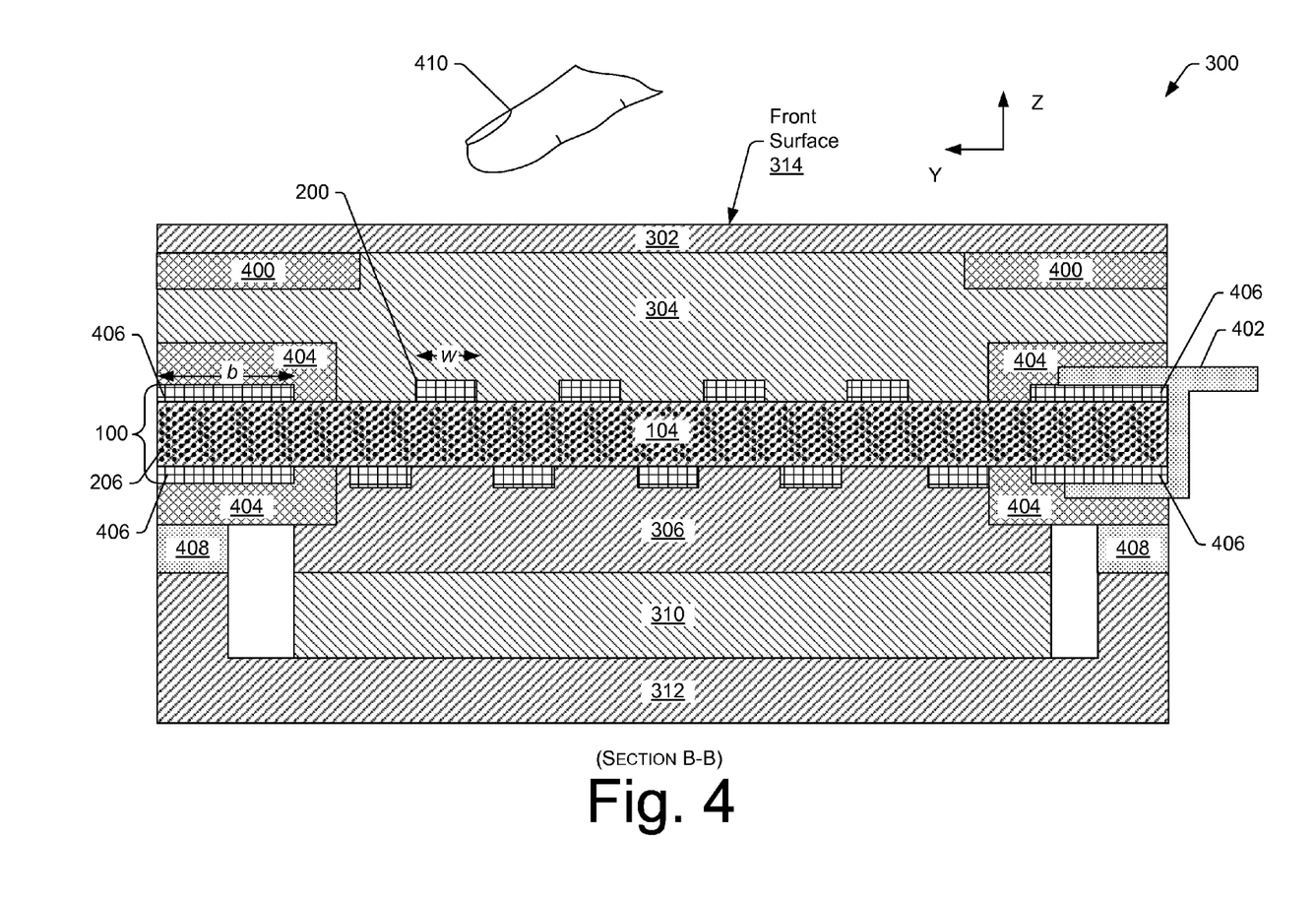
FIG. 4 illustrates a side, cross-sectional view of the example electronic device of FIG. 3 along section B-B according to an embodiment.
Figure 5:
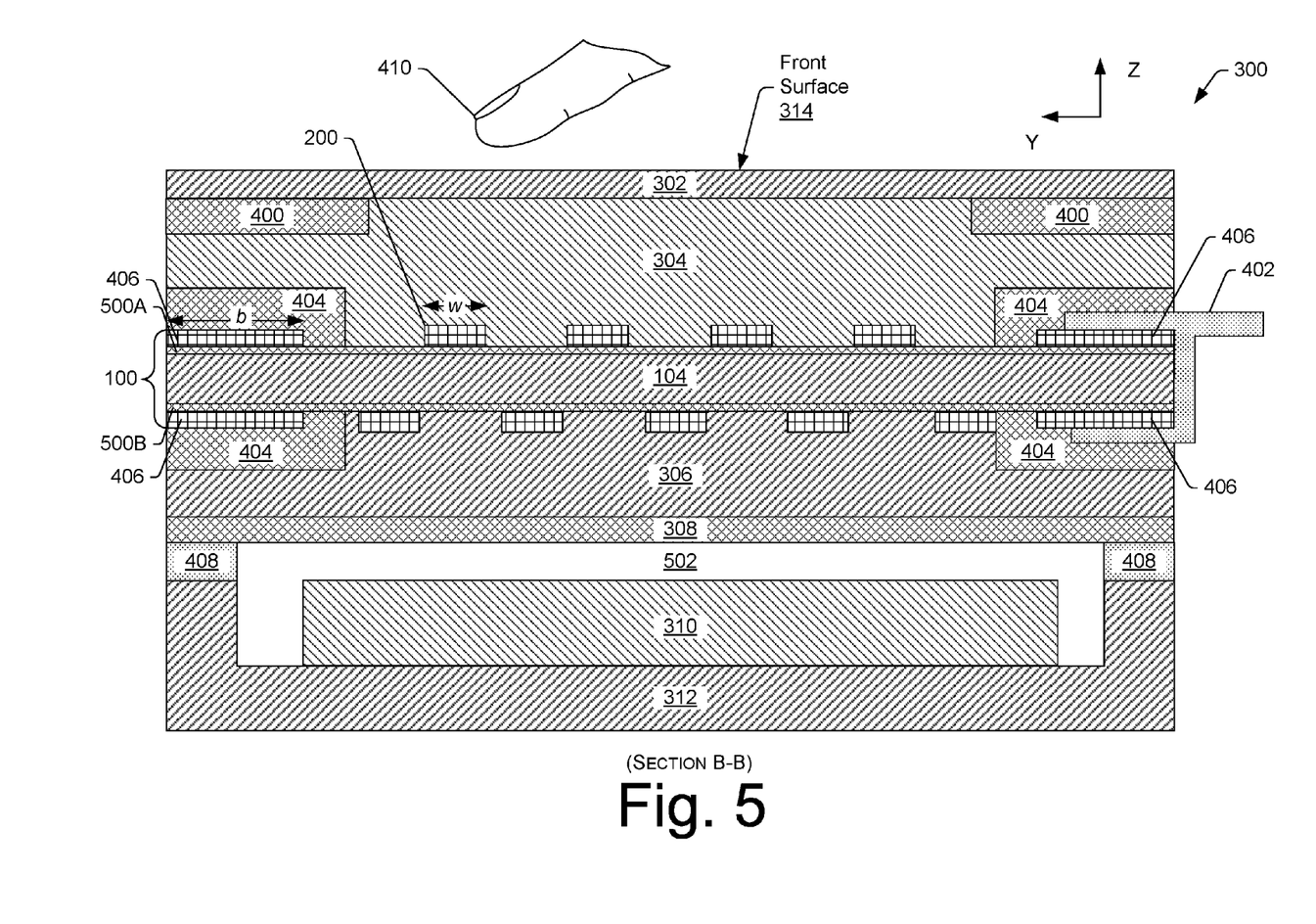
FIG. 5 illustrates a side, cross-sectional view of the example electronic device of FIG. 3 along section B-B according to another embodiment.

The first OCA layer 304 may have a thickness (in the z-direction of FIGS. 3-5) included in a range of about 100 microns (or micrometers (μm)) to about 200 microns, and the specific thickness of the first OCA layer 304 may vary based on the specific implementation of the cover lens 302. With reference to FIGS. 4 and 5, a decorative mask 400 may be added to the cover lens 302, according to an embodiment, such as by adding the decorative mask 400 to the back side/surface of the cover lens 302, as shown in FIGS. 4 and 5. The decorative mask 400 may comprise a layer of ink that is deposited around the periphery of the cover lens 302 at the back surface of the cover lens 302. The decorative mask 400 may mitigate light leakage from the electronic device 300 and may offer a level of opacity around the border of the cover lens 302 that improves the optical quality of the display.

Depending on the ink color (white, black, etc.), the thickness of the first OCA layer 304 may vary to provide a step coverage of the decorative mask 400. For example, when black ink is used for the decorative mask 400, the thickness of the decorative mask 400 may be included in a range of about 10 microns to about 15 microns. In this scenario, the thickness of the first OCA layer 304 may be about 100 microns to provide sufficient step coverage of the decorative mask 400. Alternatively, when white ink is used for the decorative mask 400, the thickness of the decorative mask 400 may be included in a range of about 40 microns to about 45 microns. In this scenario, the thickness of the first OCA layer 304 may be about 200 microns to provide sufficient step coverage of the decorative mask 400. Thus, in some embodiments, the thickness of the first OCA layer 304 may be no greater than about 200 microns, no greater than about 180 microns, no greater than about 160 microns, no greater than about 140 microns, or no greater than about 120 microns. In some embodiments, the thickness of the first OCA layer 304 may be at least about 100 microns, at least about 120 microns, at least about 140 microns, at least about 160 microns, or at least about 180 microns.

In some embodiments, the first OCA layer 304 may comprise UV stabilizers to protect one or more of the interior components (e.g., the touch sensor 100) from UV degradation due to long-term UV radiation exposure, as described above. Any suitable UV stabilizer may be used for the UV cut of the first OCA layer 304, such as UV absorbers (e.g., benzophenones, benzotriazoles, or hydroxyphenyl triazines, etc.), HALS, or the like. Regardless of the type of UV stabilizer used for the first OCA layer 304, the UV stabilizer may be added in a manner so as to not affect the optical properties of the first OCA layer 304 (e.g., color, transmittance, haze, etc.). For example, the first OCA layer 304 with UV cut may have a b* value that is no greater than about 0.5, and a haze value that is no greater than about 0.5% to maintain good optical performance.

The first OCA layer 304 may have good adhesion to both the cover lens 302 and to the touch sensor 100 within a range of relevant temperatures that the electronic device 300 is expected to experience in the field (e.g., up to at least about 85° C.). The first OCA layer 304 may also exhibit little to no plastic deformation due to mechanical and/or thermal stress. That is, the first OCA layer 304 may be made of a material that exhibits elastic deformation within relevant temperature ranges and mechanical stress that are expected in the field.

The touch sensor 100 may be disposed under the first OCA layer 304, which may act to bond the cover lens 302 to the touch sensor 100. The touch sensor 100 may comprise a metal mesh 102 as described above with reference to FIG. 1. The metal lines 200 or particles that constitute the metal mesh 102 may be deposited (patterned) on the substrate 104 via an additive process (e.g., a printing process) or by a subtractive process (e.g., photolithography, etching, etc.). The lines 200 or particles of the metal mesh 102 may be no greater than about 5 microns in width, w (as shown in FIGS. 4 and 5). For example, an individual metal line may have a width, w, that is no greater than about 4 microns, no greater than about 3 microns, no greater than about 2 microns, or no greater than about 1 micron. Furthermore, a pitch, p, (See FIG. 2) of the metal lines 200 may be included in a range of about 160 microns to about 300 microns. It is noted that the pitch, p, as shown in FIG. 2, is considered to be the distance from a center of a metal line 200 on the front surface 202 of the substrate 104 to a center of a metal line 200 on the back surface 204 of the substrate that is the next adjacent metal line 200 to the right or left of the metal line 200 on the front surface 202. The metal lines 200 may not align with each other in the z-direction of FIG. 2 with respect to the front and back surfaces 202, 204 of the substrate 104. In one example, a next adjacent metal line 200 on the back surface 204 may be offset from a metal line 200 on the front surface 202 by about 50%. In this scenario, the pitch, p, may be about half of the distance between the respective centers of two adjacent metal lines 200 on either surface of the substrate 104.

In light of the above characteristics, the metal mesh 102 may not be visible to the human eye. With such dimensions and optimal spacing between the metal lines or particles, the metal mesh 102, in some embodiments, may constitute no greater than about 2% of the total area of the touch sensor 100 so that the touch sensor 100 maintains suitable transmittance. For example, the transmittance of the touch sensor 100 with the metal mesh 102 may be at least about 85%, with a haze no greater than about 1.5%, and a b* value (in the CIELAB color space) that is no greater than about 1. In some cases, the b* value of the touch sensor 100 may be no greater than about 0, no greater than about −0.5, or no greater than about 0.1. In some embodiments, the sheet resistance of the electrically conductive metal mesh 102 may be no greater than about 60 ohms per square (Ω/sq).

In some embodiments, the reflectivity of the metal mesh 102 may be reduced or mitigated so that it does not reflect unwanted light in the eyes of the user (e.g., when under direct sunlight). In one example, the metal mesh 102 may be put down on the substrate 104 in varying manners to control the surface roughness of the metal mesh 102. A metal mesh 102 having a higher surface roughness will exhibit reduced reflectivity. As another example, the metal mesh 102 may have a level of porosity that reduces the reflectivity of the metal mesh 102. As yet another example, the metal mesh 102 may be coated, on at least a portion of the metal lines 200, with a dark (e.g., black material) that makes the metal mesh 102 less visible and reduces the reflectivity of the metal mesh. In some embodiments, the dark (anti-reflective) coating may be added to a front or top surface of the metal lines 200. In other embodiments, the entirety of the metal lines 200 may be coated with dark material, or the sidewalls (side portions) of the metal lines 200 may be coated. In some embodiments, the coating may be comprised of a conductive material to mitigate any increase in contact resistance of the touch sensor 100. Regardless of the specific treatment to the metal mesh 102, the metal mesh 102 may exhibit substantially no color in reflection mode (e.g., a reflective b* value that is no greater than about 0.5, no greater than about 0, no greater than about −0.5, or no greater than about −1) so that the metal mesh 102 is not visible to the naked eye in the off and on state of the electronic device 300.

The touch sensor 100 may further comprise a low birefringence substrate 104, as introduced with reference to FIG. 1. The metal mesh 118 may be disposed on at least a portion of the substrate 104 and on the front surface 202 of the substrate 104 and the back surface 204 of the substrate 104. The substrate 104 may be made of a low birefringence material that exhibits optical characteristics such as low haze (e.g., a haze of no greater than about 0.5%), high transmittance (e.g., a transmittance of at least about 90%), and substantially no discernable color (e.g., a b* value that is no greater than about 0.5) for wavelengths of light used by the display module 310 of the electronic device 300.

In some embodiments, birefringence may be measured as the difference of indices of the refraction of the light beam portions within the optical material. For a light beam that has been split into two portions by an optical material, birefringence is the difference of the indices of refraction of the two light beam portions within the material. The low birefringence of the substrate 104 is used herein to describe the "intrinsic" birefringence of the substrate 104, as opposed to "induced" birefringence. Induced birefringence may occur, in some optical materials, when the substrate 104 is subjected to significant mechanical and/or thermal stress. The low birefringence characteristic of the substrate 104 enables readability of the electronic device's display under extreme conditions (e.g., direct sunlight, when the user is wearing polarized sunglasses, blackout conditions, etc.).

As noted above, an example methodology of measuring birefringence is through the notion of "retardation" (or retardance), which represents the integrated effect of birefringence acting along the path of a light beam that traverses the optical material (in this case, the substrate 104). If an incident light beam is linearly polarized, the two orthogonal portions of the polarized light will exit the substrate 104 with a phase difference, called the retardation. The fundamental unit of retardation is length, such as nanometers (nm). An average birefringence for an optical material is sometimes computed by dividing the measured retardation magnitude by the thickness of the optical material.

In light of the above explanation, the substrate 104 of the touch sensor 100 may have a retardation value that is no greater than about 15 nm, no greater than about 10 nm, no greater than about 7 nm, no greater than about 5 nm, or no greater than about 4 nm. Such a substrate 104 is considered herein to have a "low" birefringence. Materials suitable for providing a substrate 104 with the above-mentioned properties may include, without limitation, a cyclo olefin polymer (COP), a cyclic olefin copolymer (COC), or a combination thereof. Examples of suitable COP material for use as the substrate 104 may include, without limitation, ZD-series or ZF-series (e.g., ZF 16) COP, commercially available from ZEON Chemicals® of Louisville, Ky. An example of a suitable COC material for use as the substrate 104 may include G3 COC from Dexerials Corporation® of Tokyo, Japan.

The material of the substrate 104 may have a glass transition temperature, $T_g$, of at least about 120° Celsius (C) so that the touch sensor 100 can be adhered to a flex that drives the touch sensor 100. That is, an anisotropic conductive file (ACF) to flex component 402 may be provided to electrically and mechanically couple the substrate 104 to driver electronics that are used to drive the touch sensor 100 during operation of the electronic device 300. In some embodiments, an anisotropic conductive paste (ACP) may be used in lieu of the film of the ACF to flex component 402. The bonding temperature to bond the ACF to flex component 402 to the substrate 104 may be at least about 110° C., and may reach temperatures of about 140° C. for bonding. Accordingly, the $T_g$ of the substrate 104 may be at least about 120° C., at least about 130° C., at least about 140° C., at least about 150° C., at least about 160° C., at least about 170° C., or at least about 180° C. The ACF to flex component 402 may have a particle size that is no greater than about 10 microns. In some embodiments, the substrate 104 may have low water absorption (e.g., water absorption that is no greater than about 0.1%) and low water permeation to reduce the risk of electromigration of the metal material (Ag) used for the metal mesh 102. In some embodiments the dielectric constant of the substrate 104 may be suitable to provide good touch performance. A typical dielectric constant of COP is suitable for providing good touch performance.

The substrate 104 may have a coefficient of thermal expansion that is relatively low (e.g., a coefficient of thermal expansion that is no greater than about 70 parts-per-million (ppm)/° C.) in order to avoid mismatch between other components of the electronic device 300 that also have low coefficients of thermal expansion. A mismatch in coefficients of thermal expansion between components of the electronic device 300 can cause warping or wrinkles in the components. The substrate 104 may be resistant to shrinkage (e.g., exhibit a shrinkage of no greater than about 0.1% in machine and transverse directions for roll-to-roll processing).

The substrate 104 may have a thickness (in the z-direction of FIGS. 3-5) included in a range of about 20 microns to about 100 microns. In some embodiments, the thickness of the substrate 104 may be no greater than about 100 microns, no greater than about 90 microns, no greater than about 80 microns, no greater than about 70 microns, no greater than about 60 microns, no greater than about 50 microns, no greater than about 40 microns, or no greater than about 30 microns. In some embodiments, the thickness of the substrate 104 may be at least about 20 microns, at least about 30 microns, at least about 40 microns, at least about 50 microns, at least about 60 microns, at least about 70 microns, at least about 80 microns, or at least about 90 microns.

In order to protect against UV degradation of the touch sensor 100, the substrate 104 may comprise UV stabilizers, such as in the form of embedded UV stabilizers 206 (see FIGS. 2 and 4 to create a uniform, UV cut material for the substrate 104, or a UV cut coating 500 (see FIG. 5) on the front surface 202 (UV cut coating 500A) and the back surface 204 (UV cut coating 500B) of the substrate 104. In the example of FIG. 5, the metal mesh 102 (or metal lines 200) may be applied atop the layers of UV cut coating 500 disposed on the surfaces of the substrate 104. Any suitable UV stabilizer may be used for the UV cut of substrate 104, as discussed above. One example UV stabilizer that may be used for the substrate 104 includes benzophenones. With UV stabilizers, the substrate 104 may have color stability (e.g., a delta b* of no greater than about 1) and/or mechanical stability (e.g., a percentage change in tensile modulus that is no greater than about 20%) after at least about 300 hours of exposure to UV radiation.

The second OCA layer 306 may be disposed under the touch sensor 100 in order create an optical bond between the touch sensor 100 and either of the display module 310 (see FIG. 2), or the protection film 308 (see FIG. 5). FIG. 4 illustrates an embodiment that omits the protection film 308 from the electronic device 300. In the embodiment of FIG. 4, the touch sensor 100 is bonded to the display module 310 for improved optical performance of the touch screen display.

Similar to the first OCA layer 304, the second OCA layer 306 may be comprised of a die-cut film adhesive can be cured, during a manufacturing process, through UV radiation, heat, or a combination thereof. Alternatively, the second OCA layer 306 may be comprised of a liquid OCA (LOCA) that is adapted to bond to uneven surfaces, and may offer a thinner z-dimension for the second OCA layer 306. In some embodiments, the second OCA layer 306 may be comprised of a slit coated OCA (SOCA), which is applied in a continuous layer to the back surface 204 of the touch sensor 100 during a manufacturing process.

The 3M OCA 8146® material is an example material that can be utilized for the second OCA layer 306. The material of the second OCA layer 306 may be compatible with the metal materials used for the touch sensor 100, such as silver (Ag), copper (Cu), and the like. Thus, the second OCA layer 306 may not impact electrical properties of the touch sensor 100, especially in extreme temperature and humidity conditions. In some embodiments, the material of the second OCA layer 306 may also have low water absorption, so as to prevent electromigration with the metal (e.g., Ag) used in the touch sensor 100. In some embodiments, the material of the second OCA layer 306 is acid-free to avoid corroding the metal used for the touch sensor 100. Moreover, the material for the second OCA layer 306 may also be color-stable (e.g., a delta b* that is no greater than about 0.5) after at least about 300 hours of exposure to UV radiation. Although the 3M OCA 8146® material is suitable for use with the second OCA layer 306, any other material with the aforementioned properties may be used for the material of the second OCA layer 306.

The second OCA layer 306 may have a thickness (in the z-direction of FIGS. 3-5) that, in some instances, is no greater than about 100 microns, and in other instances is no greater than about 200 microns. The maximum thickness may depend, at least in part, on whether the substrate 104 of the touch sensor 100 is bonded to the display module 310 via the second OCA layer 306 (see FIG. 4) or whether the substrate 104 is instead bonded to the protection film 308 via the second OCA layer 306 (see FIG. 5). When the substrate 104 is bonded to the display module 310 (as shown in FIG. 4), the thickness of the second OCA layer 306 may be no greater than about 200 microns. When the substrate 104 is bonded to the protection film 308 (as shown in FIG. 5), the thickness of the second OCA layer 306 may be no greater than about 100 microns. Accordingly, in some embodiments, the thickness of the second OCA layer 306 may be no greater than about 200 microns, no greater than about 180 microns, no greater than about 160 microns, no greater than about 140 microns, no greater than about 120 microns, or no greater than about 100 microns.

It is to be appreciated that, in order to further mitigate UV degradation of one or more of the components of the electronic device 300, UV stabilizers may be added to any one, or combination, of the cover lens 302, the first OCA layer 304, and/or the second OCA layer 306 in addition to the UV stabilizers of the substrate 104. It is to be appreciated that high optical performance may be maintained notwithstanding the introduction of UV cut material and/or coatings to any one or more of the aforementioned components. That is, the UV cut of the respective component may still exhibit a haze of no greater than about 0.5%, and a b* value of no greater than about 0.5 to provide a substantially clear UV cut material.

Referring again to FIG. 4, which shows the side, cross-sectional view of the example electronic device 300 along section line B-B, a passivation coating 404 may be provided on at least a portion of the metal mesh 102 of the touch sensor 100. For example, an outer portion of the metal mesh 102 may comprise traces 406 ("outer traces 406") that are disposed around a periphery of the substrate 104. The outer traces 406 may be wider than the line width, w, of the metal mesh 102 lines. For example, the width, b, of the outer traces 406 may be up to about 30 microns. For example, the outer traces 406 may have a width, b, that is no greater than about 30 microns, no greater than about 20 microns, or no greater than about 15 microns. Because the outer traces 406 are disposed around the periphery of the substrate 104, they may be more susceptible to oxidation, corrosion, and/or electromigration (e.g., with Ag traces 406) resulting from possible exposure to air, water, and/or similar contaminants. The passivation coating 404 may be applied in any suitable manner, such as screen coating, inkjet coating, vapor deposition, or lamination (e.g., dry resist). The passivation coating 404 remove impurities that cause oxidation, corrosion, or other component-damaging conditions, such as silver (Ag) electromigration during operation of the device 300. In some embodiments, the passivation coating 404 may comprise a high adhesion, UV cured coating, and/or a high surface energy coating, such as NC1-9001 coating commercially available from Henkel AG & Company® of Dusseldorf, Germany, PF-455B coating commercially available from Henkel AG & Company®, XUVD-628 or XUVD-540 coatings from Spraylat Corporation® of Pelham, N.Y., or any combination thereof.

The surface energy parameter of the passivation coating 404 may promote improved adhesion or bonding with the first OCA layer 304, the second OCA layer 306, and/or an adhesive 408 that may be used to couple the rear cover 312 to the touch sensor 100, for example. In some embodiments, the passivation coating 404 may have a surface energy of at least about 30 dynes/centimeter (dynes/cm), at least about 40 dynes/cm, or at least about 50 dynes/cm. In some embodiments, the surface energy of the passivation coating 404 may be included in a range of about 40 dynes/cm to about 56 dynes/cm.

In one example, the passivation coating 404 may comprise a coating of NC1-9001 from Henkel AG & Company®. In another example, the passivation coating 404 may comprise a PF-455B coating from Henkel AG & Company® with an additional coating of NC1-9001 from Henkel AG & Company® on top of the PF-455B coating.

The passivation coating 404 may have a thermal stability at temperatures of about 170° C. and above. The passivation coating 404 may also have a low water absorption property (e.g., water absorption of no greater than about 0.1%) and low water permeation to prevent electromigration of the metal (e.g., Ag) used for the touch sensor 100. The passivation coating 404 may be UV curable. The passivation coating 404 may have a breakdown voltage of at least about 1000 VAC when the passivation coating is about 10 microns in thickness. The passivation coating 404 may have an insulation resistance of at least about $10^9$ ohms. The passivation coating 404 may also be substantially free of porosity, which may be enabled by applying multiple layers of the passivation coating 404 (e.g., 2 layers).

The passivation coating 404 may have a thickness (in the z-direction of FIGS. 3-5) that is included in a range of about 5 microns to about 10 microns. In some embodiments, the thickness of the passivation coating 404 may be no greater than about 10 microns, no greater than about 8 microns, or no greater than about 6 microns. In some embodiments, the thickness of the passivation coating 404 may be at least about 5 microns, at least about 7 microns, or at least about 9 microns.

In some embodiments, a multi-functional coating may be provided on the touch sensor 100 on the front surface 202 and/or the back surface 204 of the substrate 104 atop the metal mesh 102. Such a multi-functional coating may provide both a passivation coating and a UV cut material or UV stabilizers to help protect the substrate 104 from UV degradation. Although FIGS. 4 and 5 show the passivation coating 404 on the periphery of the touch sensor 100 at the outer traces 406, either the passivation coating 404, or the above-mentioned multi-functional coating (i.e., passivation plus UV cut) may be applied to the entire touch sensor 100 surface on the front surface 202 and/or the back surface 204 of the substrate 104. Such a coating may exhibit low haze, low color, and high transmittance, as described herein, so as to not degrade optical performance.

As shown in FIG. 4, the rear cover 312 may be coupled to the touch sensor 100 via the adhesive 408, which may be any suitable adhesive or fixing agent for adhering the rear cover 312 to the touch sensor 100. Particularly, FIG. 4 shows that, because the passivation coating 404 may be applied to the outer traces 406, the adhesive 408 actually bonds to the passivation coating 404. Thus, the surface energy property of the passivation coating 404 becomes a promoter of good adhesion characteristics. The rear cover 312 may be made of any suitable material, such as acrylonitrile butadiene styrene (ABS) plastic, or another rigid, or semi-rigid, material suitable for electronic device enclosures.

Referring specifically to FIG. 5, an embodiment is shown that includes the protection film 308 introduced in FIG. 3. The embodiment of FIG. 5 may be cheaper to manufacture because there is no direct optical bond between the touch sensor 100 and the display module 310. Instead, an air gap 502 remains between the protection film 308 and the display module 310. In this manner, integration of the touch sensor 100 into the electronic device 300 may be a less complex process, and cheaper to manufacture. The protection film 308 may comprise a low birefringence protection film 308 having properties similar to the substrate 104 of the touch sensor 100 in terms of birefringence. That is, the protection film 308 may have a retardation value that is no greater than about 15 nm. In some embodiments, the protection film 308 may be comprised of a material such as a COP, a COC.

In some embodiments, the protection film 308 may comprise an anti-reflective (AR) coating to improve optical performance of the display. The antireflective coating may be applied to the back surface of the protection film 308 to provide a more gradual change in the index of refraction from the air gap 502 to the protection film 308. Such an AR coating may be comprised of an inorganic material, an organic material, or a hybrid material that may be sputtered on the protection film 308 in one or more layers. For example, the AR coating may comprise an AR "moth-eye" coating that creates an index gradient (and thus AR properties) using two-dimensional (2D) periodic arrays of tapered sub-wavelength structures. A single layer AR coating may have an index of refraction that is between the indices of refraction of the air gap 502 and the protection film 308, respectively. In some embodiments, the AR coating may comprise a multi-layer coating with gradually different indices of refraction.

The protection film 308 may have a thickness (in the z-direction of FIGS. 3-5) included in a range of about 20 microns to about 100 microns. In some embodiments, the thickness of the protection film 308 may be no greater than about 100 microns, no greater than about 90 microns, no greater than about 80 microns, no greater than about 70 microns, no greater than about 60 microns, no greater than about 50 microns, no greater than about 40 microns, or no greater than about 30 microns. In some embodiments, the thickness of the protection film 308 may be at least about 20 microns, at least about 30 microns, at least about 40 microns, at least about 50 microns, at least about 60 microns, at least about 70 microns, at least about 80 microns, or at least about 90 microns.

It is to be appreciated that the specific dimensions, proportions, shapes and configurations of the components 302-312, the touch sensor 100, and of the electronic device 300 itself, described herein are not specific to the present invention. For example, the components 302-312 and the touch sensor 100 may be of various sizes (length and/or width), and shapes (e.g., rectangular, elliptical, square, triangular, etc.) without changing the basic characteristics of the electronic device 300. As another example, the components may be flat or they may be curved, such as in a curved display panel.

Moreover, the touch sensor 100 may be based on any principle of operation for sensing touch-based contact or proximity at the front surface 314 of the cover lens 302 from an object (e.g., a user's finger 410 illustrated in FIGS. 4 and 5). In one example, the touch sensor 100 is a capacitive touch sensor 100. However, the touch sensor 100 may be based on other principles, such as resistive, or another suitable principle of operation.

Example Process

Figure 6:
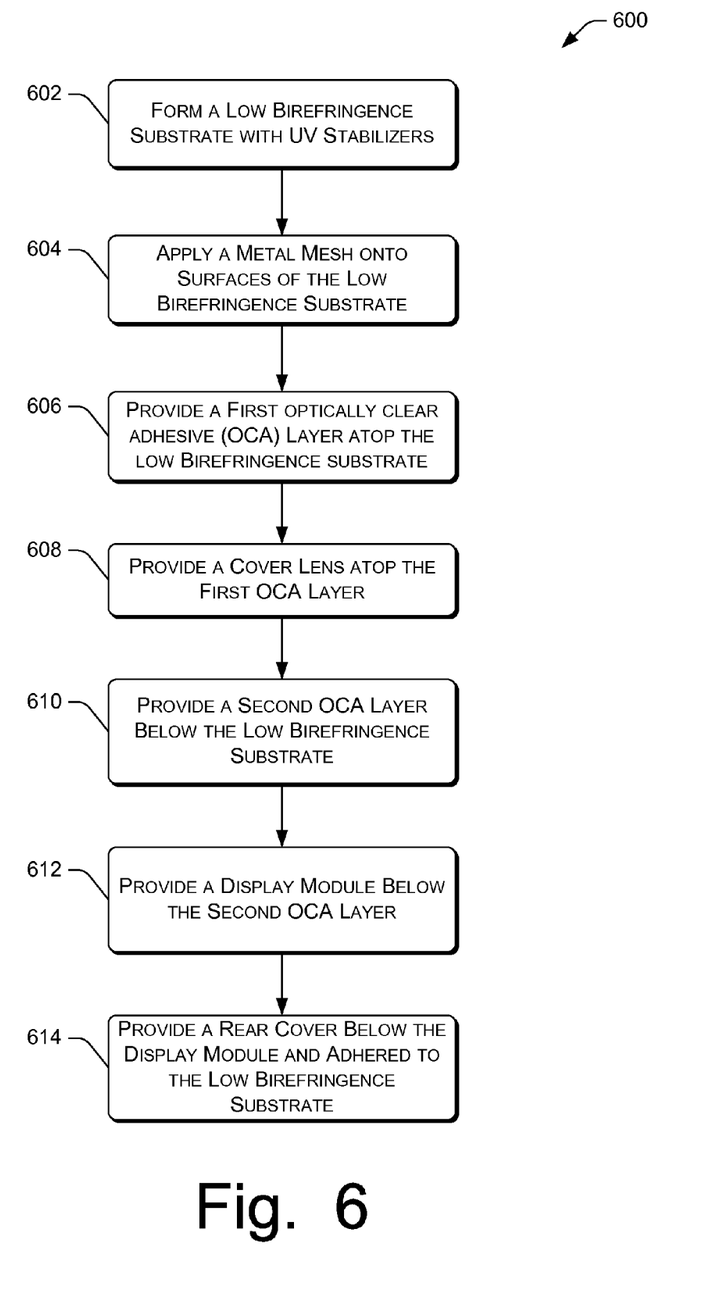
FIG. 6 is a flow diagram of an illustrative process of manufacturing at least part of a touch screen display of an electronic device.

FIG. 6 describes a process 600 of manufacturing at least part of a touch screen display of an electronic device 300, and the process 600 may be implemented to manufacture, fabricate, or produce any of the embodiments of the electronic device 300 illustrated in FIGS. 3-5. This process is illustrated as a collection of blocks in a logical flow graph. The order in which the operations are described is not intended to be construed as a limitation, and any number of the described blocks can be combined in any order or in parallel to implement the process.

At 602, a low birefringence substrate 104 comprising UV stabilizers may be formed. In some embodiments, UV stabilizers 206 may be embedded within the substrate 104 mixing the UV stabilizers 206 with a resin that is to ultimately form the substrate 104. The formation of the substrate 104 from resin to solid may involve an injection molding technique, or any other suitable technique. In some embodiments, the substrate 104 may be formed by extrusion, additive manufacturing, or any other suitable method. In some embodiments, the base material (e.g., COP, COC, or the like) of the substrate 104 may be formed, and a UV cut coating 500 may be provided on the front and back surfaces 202, 204 of the substrate 104 (see FIG. 5). The UV cut coating 500 may be applied to the substrate 104 base material by sputtering or another suitable physical vapor deposition (PVD) technique. In this scenario, the UV cut material of the coating 500 may be comprised of inorganic elements. Alternatively, organic coatings with UV absorbers/stabilizers may be used for the UV cut coating 500 applied to the substrate 104. In this scenario, the organic UV cut coating may be deposited on the substrate 104 by solvent evaporation, thermal curing, or the like. Furthermore, the hardness of the UV cut coating 500 may be of a similar hardness to that of the hardness of the substrate 104 base material (e.g., COP, COC, etc.). This is to prevent the substrate 104 from becoming brittle by application of the UV cut coating 500.

The UV stabilizers of the substrate 104 formed at 602 protect the substrate 104 from various levels of UV exposure that it may experience throughout the manufacturing process and during use of the end product by a consumer. The UV exposure during manufacturing is explained in further detail below.

At 604, a metal mesh 102 may be applied to a front surface 202 and a back surface 204 of a low birefringence substrate 104 to form a touch sensor 100. Any suitable technique may be utilized at 604 for applying the metal mesh 102 to the substrate 104, such as a screen printing technique, photolithography, and so on. The metal mesh 102 may be made from conductive metal such as silver (Ag), copper (Cu), alloys or combinations thereof, and the metal mesh 102 may cover at least a portion of the substrate 104 surface that it is applied to. In some embodiments, the metal mesh 102 may cover substantially an entirety of the front surface 202 of the substrate 104. The pattern of the metal mesh 102 may be any suitable pattern of metal lines 200 or particles, such as a grid pattern (e.g., a rectangular grid pattern). In some embodiments, the metal lines 200 that constitute the metal mesh 102 may be coated with a dark (anti-reflective) material on at least a portion of the metal lines 200 to reduce the reflectivity of the metal mesh 102. In some embodiments, a passivation coating 404 may be applied to at least a portion of the metal mesh 102, such as by coating outer traces 406 around the periphery of the substrate 104, or by coating substantially an entirety of the substrate 104 on either or both surfaces 202, 204 with the passivation coating 404. The passivation coating 404 may be a UV-cured passivation coating due to the thermal constraints of the substrate 104. That is, the substrate 104 may have a CTE that is no greater than about 70 ppm/° C. and $T_g$ that is no greater than about 140° C., which means that if a thermal-cured passivation coating were used (typically cured at around 100-130° C. and above), the substrate 104 may warp or otherwise be damaged. Thus, a UV-cured passivation coating 404 may be applied to at least a portion of the metal mesh 102, in which case, the UV stabilizers of the substrate 104 become all the more protective of the substrate 104 material.

In some embodiments, step 604 may include applying an optically clear, multi-function coating (e.g., passivation plus UV cut) to either or both surfaces 202, 204 of the substrate 104 having the deposited metal mesh 102. That is, after the metal mesh 102 is applied to the substrate 104, the multi-function coating may be applied atop the metal mesh 102. This multi-function coating may be applied using screen printing, slit coating, or another suitable technique. After application of the multifunction coating, portions of the multi-function coating may be removed to allow for electrical connections to be made to portions of the metal mesh 102, such as removal of the multi-function coating at the traces 406 around the periphery of the substrate 104.

At 606, a first OCA layer 304 may be provided atop the low birefringence substrate 104 at the front surface 202 of the substrate 104.

At 608, a cover lens 302 may be provided on the first OCA layer 304 such that the first OCA layer 304 is disposed between the touch sensor 100 and the cover lens 302. In some embodiments, a decorative mask 400 may be printed on the cover lens 302 around a periphery of the cover lens 302 before the cover lens 302 is provided on the first OCA layer 304 at 608. In some embodiments, pressure may be applied to the front surface 314 of the cover lens 302 to develop a firm optical bond between the cover lens 302 and the touch sensor 100. In some embodiments, heat and/or UV radiation may be utilized to promote a stronger bond and/or cure the first OCA layer 304. In some embodiments, an autoclave or similar apparatus may be utilized to remove air/bubbles from the first OCA layer 304 by applying dry heat and/or pressure to the assembly over a time interval.

At 610, a second OCA layer 306 may be provided on the low birefringence substrate 104 at the back surface 204 of the substrate 104. The second OCA layer 304 may be a solid OCA layer, a LOCA layer, or a SOCA layer. Providing a LOCA layer at 610 may involve applying the LOCA layer in a dot pattern and subsequently applying pressure with an overlaid component to spread out the LOCA into a layer. Providing a SOCA layer at 610 may involve applying a continuous layer of OCA on the back surface 204 of the substrate 104. In this scenario, the SOCA may be procured before lamination, or lamination may occur before curing the SOCA.

At 612, a display module 310 may be provided on the second OCA layer 306 such that the second OCA layer 306 is disposed between the display module 310 and the touch sensor 100. In some embodiments, pressure may be applied to the back surface of the display module 310 to develop a firm optical bond between the display module 310 and the touch sensor 100. In some embodiments, heat and/or UV radiation may be utilized to promote a stronger bond and/or cure the second OCA layer 306. In some embodiments, an autoclave or similar apparatus may be utilized to remove air/bubbles from the second OCA layer 306 by applying dry heat and/or pressure to the assembly over a time interval.

At 614, a rear cover 312 may be adhered to the touch sensor 100 at the back surface 204 of the substrate 104. When a passivation coating 404 is provided on the metal mesh 102, the rear cover 312 may be adhered to the passivation coating 404.

It is to be appreciated that performance of the process 600 may result in the formation of at least part of a touch screen of an electronic device 300. Additional or fewer steps may be performed in an actual manufacturing process to form an electronic device, such as the electronic device 300.

Example Electronic Device

Figure 7:
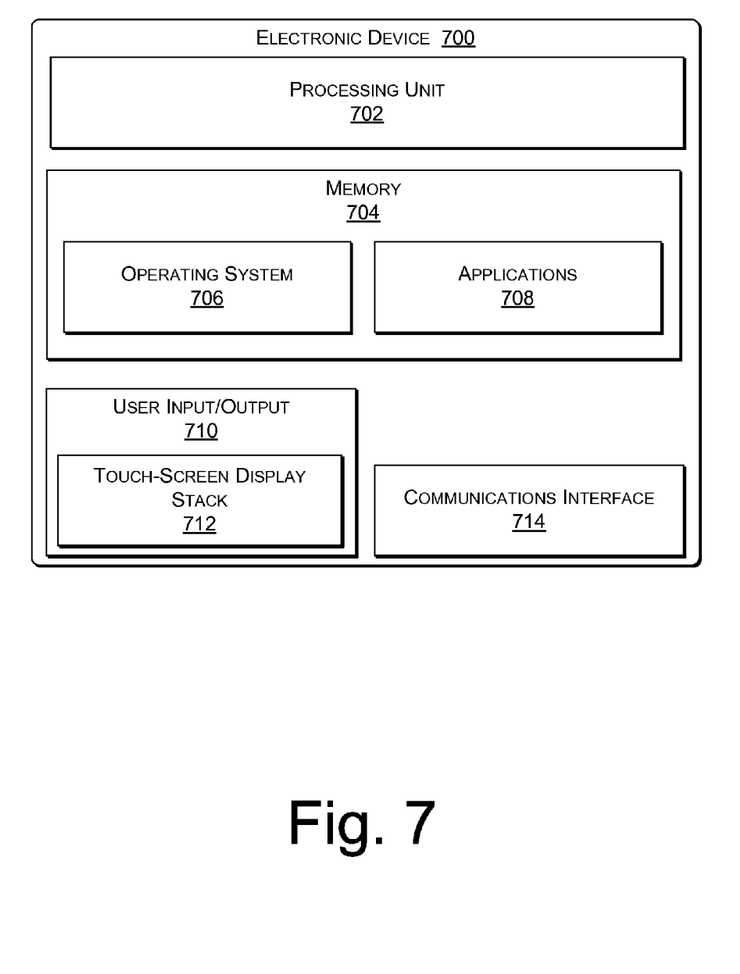
FIG. 7 is a block diagram showing high-level components of an example electronic device that may be used in conjunction with the systems and techniques described herein.

FIG. 7 shows relevant components of an example electronic device 700 that may be used to implement the systems and techniques disclosed herein. The electronic device 700 may of course be implemented in many different ways. The electronic device 700 may comprise any of the above-enumerated devices introduced with reference to the electronic device 300 of FIG. 3, such as a tablet computing device.

The example electronic device 700 may comprise one or more processing units 702 and one or more forms of computer-readable memory 704. The memory 704 may comprise volatile and nonvolatile memory. Thus, the memory 704 may include, but is not limited to, random access memory (RAM), read-only memory (ROM), electrically erasable programmable ROM (EEPROM), flash memory, or other memory technology, or any other medium which can be used to store applications and data. The memory 704 may also include removable media such as optical disks, portable devices/drives, and so forth.

The memory 704 may be used to store any number of functional components, such as programs and program modules that are executable on the processing unit 702. For example, the memory 704 may store an operating system 706 and various applications or user-specified programs 708. The operating system 706 and/or the user-specified programs 708 may include components, modules, and/or logic for performing the actions described herein. More specifically, executable components stored in the memory 704 may comprise computer-executable instructions that, when executed, cause the one or more processing units 702 to perform acts and to implement techniques described herein.

The electronic device 700 may also have user input/output components 710, such as a display (e.g., a touch-screen display stack 712), keyboard, mouse, etc. The touch-screen display stack 712 may be constituted by at least the touch sensor 100 and the components 302-312 of the previous figures. The electronic device 700 may also comprise a communications interface 714 such as a network interface.

Generally, the functionality described herein may be implemented by one or more electronic devices such as shown by FIG. 7 or by similar devices, with the various actions described above (e.g., detecting touch-based input from an object) distributed in various ways across the different electronic devices.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An apparatus comprising:
   a touch sensor comprising:
      a substrate having a retardation value that is no greater than about 15 nanometers (nm) and having a front surface and a back surface;
      a first plurality of metal lines disposed on the front surface of the substrate in a first pattern;
      a second plurality of metal lines disposed on the back surface of the substrate in a second pattern; and ultraviolet (UV) stabilizers, the UV stabilizers being disposed in the substrate, on at least a portion of the front surface or the back surface of the substrate, or on at least a portion of the first and the second plurality of metal lines, the first plurality of metal lines and the second plurality of metal lines being configured to operate as transmitter and receiver electrodes of the touch sensor, the touch sensor being configured to detect a change in a capacitive coupling between the transmitter electrode and the receiver electrode;

a first optically clear adhesive (OCA) layer disposed atop the touch sensor;

a cover lens disposed atop the first OCA layer;

a second OCA layer disposed under the touch sensor; and a display module disposed under the second OCA layer.

2. The apparatus of claim 1, wherein the UV stabilizers are at least one of: (i) embedded within the substrate, or (ii) formed as a first layer disposed on the front surface and a second layer disposed on the back surface of the substrate.

3. The apparatus of claim 1, wherein the substrate is comprised of at least one of: a cyclo olefin polymer (COP) or a cyclic olefin copolymer (COC).

4. An apparatus comprising:
a touch sensor comprising:
a substrate having a front surface and a back surface;
a metal mesh disposed on a portion of the front surface of the substrate or on a portion of the back surface of the substrate; and
ultraviolet (UV) stabilizers, the UV stabilizers being disposed in the substrate, on at least a portion of the front surface or the back surface of the substrate, or on at least a portion of the metal mesh;
an optically clear adhesive (OCA) layer disposed atop the touch sensor; and
a cover lens disposed atop the OCA layer.

5. The apparatus of claim 4, wherein the substrate has a retardation value that is no greater than about 15 nanometers (nm).

6. The apparatus of claim 4, wherein the substrate is comprised of at least one of: a cyclo olefin polymer (COP) or a cyclic olefin copolymer (COC).

7. The apparatus of claim 4, wherein the substrate has a haze value that is no greater than about 0.5%.

8. The apparatus of claim 4, wherein the substrate has a transmittance value that is at least about 90%.

9. The apparatus of claim 4, wherein the substrate has a glass transition temperature that is at least about 120° Celsius (C).

10. The apparatus of claim 4, wherein the OCA layer is a first OCA layer, the apparatus further comprising:
a second OCA layer disposed under the touch sensor; and
a display module disposed under the second OCA layer.

11. The apparatus of claim 4, wherein the UV stabilizers are embedded within the substrate.

12. The apparatus of claim 4, wherein the UV stabilizers are formed as a first layer disposed on the front surface and a second layer disposed on the back surface of the substrate.

13. The apparatus of claim 4, further comprising a passivation coating disposed on at least a portion of the metal mesh, the passivation coating having a surface energy of at least about 40 dynes per centimeter (cm).

14. The apparatus of claim 13, wherein the UV stabilizers are included in the passivation coating.

15. The apparatus of claim 13, further comprising a rear cover disposed under the touch sensor and adhered to the passivation coating at the back surface of the substrate.

16. The apparatus of claim 4, wherein the OCA layer is a first OCA layer, the apparatus further comprising:
a second OCA layer disposed under the touch sensor;
a film having an anti-reflective coating disposed under the second OCA layer to seal the second OCA layer;
a rear cover disposed under the film and adhered to the film; and
a display module disposed atop the rear cover and under the film to allow for an air gap to exist between the display module and the film.

17. The apparatus of claim 4, wherein the substrate has a thickness in a range of about 20 micrometers to about 100 micrometers.

18. The apparatus of claim 4, wherein the metal mesh has a pitch in a range of about 160 micrometers to about 300 micrometers.

19. The apparatus of claim 4, wherein the OCA layer is of a thickness in a range of about 100 micrometers to about 200 micrometers.

20. A method of manufacturing at least part of a touch screen of an electronic device, the method comprising:
forming a substrate comprising ultraviolet (UV) stabilizers;
applying a first portion of a metal mesh to a front surface of the substrate;
applying a second portion of the metal mesh to a back surface of the substrate;
providing a first optically clear adhesive (OCA) layer atop the first portion of the metal mesh;
providing a cover lens atop the OCA layer;
providing a second OCA layer disposed over the second portion of the metal mesh;
providing a display module under the second OCA layer; and
providing a rear cover under the display module and adhering the rear cover to the back surface of the substrate.

21. The method of claim 20, wherein the forming the substrate comprises mixing the UV stabilizers within a resin to embed the UV stabilizers within the substrate.

22. The method of claim 21, wherein the resin comprises at least one of: a cyclo olefin polymer (COP) or a cyclic olefin copolymer (COC).

23. The method of claim 20, wherein forming the substrate comprises forming a first layer including the UV stabilizers on the front surface of the substrate and a second layer including the UV stabilizers on the back surface of the substrate, wherein the first portion of the metal mesh is disposed over the first layer and the second portion of the metal mesh is disposed over the second layer.

24. The method of claim 20, further comprising forming a passivation layer, the passivation layer disposed on at least a portion of the metal mesh.

25. The method of claim 20, further comprising forming a first layer having a material having lower reflectivity than a reflectivity of the metal mesh, the first layer being disposed on at least one of the first portion or the second portion of the metal mesh.

26. The method of claim 20, further comprising forming a first layer disposed on the first and the second portions of the metal mesh, the first layer acting as a passivation layer and being configured to block ultraviolet (UV) radiation.

27. The method of claim 26, further comprising removing at least a portion of the first layer to allow for an electrical connection to be made to a portion of the metal mesh.

* * * * *